(12) United States Patent
Kang et al.

(10) Patent No.: US 11,181,389 B2
(45) Date of Patent: Nov. 23, 2021

(54) APPARATUS AND SYSTEM FOR GUIDING DRIVING WITH LINGUISTIC DESCRIPTION OF DESTINATION

(71) Applicant: ELECTRONICS AND TELECOMMUNICATIONS RESEARCH INSTITUTE, Daejeon (KR)

(72) Inventors: Jung Gyu Kang, Daejeon (KR); Kyoung Wook Min, Sejong (KR); Yong Woo Jo, Daejeon (KR); Doo Seop Choi, Sejong (KR); Jeong Dan Choi, Daejeon (KR); Dong Jin Lee, Daejeon (KR); Seung Jun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 44 days.

(21) Appl. No.: 16/698,792

(22) Filed: Nov. 27, 2019

(65) Prior Publication Data

US 2020/0182648 A1 Jun. 11, 2020

(30) Foreign Application Priority Data

Dec. 6, 2018 (KR) ........................ 10-2018-0156214

(51) Int. Cl.
*G01C 21/36* (2006.01)
*G06F 3/0484* (2013.01)
(Continued)

(52) U.S. Cl.
CPC ....... *G01C 21/3629* (2013.01); *G06F 3/0484* (2013.01); *G06K 9/46* (2013.01); *G10L 13/00* (2013.01)

(58) Field of Classification Search
CPC ... G01C 21/3629; G06F 3/0484; G10L 13/00; G06K 9/00671; G06K 9/00791; G06K 9/46

See application file for complete search history.

(56) References Cited

U.S. PATENT DOCUMENTS 6,078,865 A * 6/2000 Koyanagi .......... G01C 21/3644
701/438
9,052,212 B2 * 6/2015 Doan ................... G01C 21/367
(Continued)

FOREIGN PATENT DOCUMENTS

| KR | 20070049012 A | 5/2007 | |
| KR | 20170047922 A | 5/2017 | |
| WO | WO-2020086051 A1 * | 4/2020 | ............. G06F 16/29 |

OTHER PUBLICATIONS

David L. Chen and Raymond J. Mooney. 2011. Learning to interpret natural language navigation instructions from observations. In Proceedings of the Twenty-Fifth AAAI Conference on Artificial Intelligence (AAAI'11). AAAI Press, 859-865. (Year: 2011).*

*Primary Examiner* — Andrea N Long

(57) ABSTRACT

Provided is a driving guide system, and more specifically, a system for guiding a vehicle occupant in driving through linguistic description. One embodiment of the present invention is an apparatus for guiding driving with linguistic description of a destination, which is installed on a vehicle and guides driving by outputting a linguistic description of a destination building, wherein the apparatus sets a destination according to a command or input, receives appearance information of a building of the destination from a server, and represents and outputs the appearance information in a linguistic form.

18 Claims, 8 Drawing Sheets

(51) Int. Cl.
*G06K 9/46* (2006.01)
*G10L 13/00* (2006.01)

(56) References Cited

U.S. PATENT DOCUMENTS

| | | | |
|---|---|---|---|
| 10,025,096 B2 | 7/2018 | Yoon et al. | |
| 2006/0224303 A1* | 10/2006 | Hayashi | G01C 21/3667 |
| | | | 701/431 |
| 2013/0325481 A1* | 12/2013 | van Os | H04R 5/00 |
| | | | 704/275 |
| 2015/0094955 A1* | 4/2015 | Lee | H04W 4/021 |
| | | | 701/532 |
| 2017/0074673 A1* | 3/2017 | Hirai | G01C 21/3605 |
| 2017/0300150 A1* | 10/2017 | Choe | G06F 3/04815 |
| 2018/0101172 A1 | 4/2018 | Min et al. | |

\* cited by examiner

APPROACH DIRECTION:
APPROACH FROM WEST

FEATURES:
 GLASS WALL, WHITE WALL,
 4-STORIES HIGH,
 AT 1 O'CLOCK

APPROACH DIRECTION:
 APPROACH FROM NORTH

FEATURES:
 SIGNBOARD,
 GLASS STRUCTURE,
 5-STORIES HIGH,
 AT 11 O'CLOCK

APPROACH DIRECTION:
 APPROACH FROM SOUTH

FEATURES:
 WHITE WALL,
 3-STORIES HIGH,
 AT 2 O'CLOCK

APPROACH DIRECTION:
APPROACH FROM EAST

FEATURES:
 2 STORIES AND
 4 STORIES HIGH,
 WHITE WALL,
 AT 10 O'CLOCK

APPARATUS AND SYSTEM FOR GUIDING DRIVING WITH LINGUISTIC DESCRIPTION OF DESTINATION

CROSS-REFERENCE TO RELATED APPLICATION

This application claims priority to and the benefit of Korean Patent Application No. 2018-0156214, filed on Dec. 6, 2018, the disclosure of which is incorporated herein by reference in its entirety.

BACKGROUND

1. Field of the Invention

The present invention relates to a driving guide system, and more specifically, to a system for guiding a vehicle occupant in driving through linguistic description.

2. Discussion of Related Art

The following descriptions merely provide background information relevant to present embodiments rather than constituting the related art.

Navigation technology is a representative example of a driving guide system. In response to entering a destination, the navigation technology may search for a route from a starting point and assist to establish the optimal route among the found routes and consistently provide a driver with guidance information for guiding the driver to the route until arrival at the destination.

However, the current navigation technology is incapable of accurately guiding the driver to the destination and terminates guiding in the vicinity of the destination due to a global positioning system (GPS) error, and thus the driver needs to directly identify surrounding buildings and the like outside the vehicle in the vicinity of the destination.

Such a limitation is a fatal flaw that may not only cause inconvenience to the driver, but most importantly allow the driver to neglect paying attention to a forward direction, which may lead to an accident.

On the other hand, recently, research on autonomous driving technology is actively being conducted worldwide. The driving guide system for providing occupants with a guide about a destination in the vicinity of the destination is needed even for the autonomous driving vehicles.

SUMMARY OF THE INVENTION

The present invention provides a driving guide system that allows a driver to keep his or her eyes directed ahead by informing the driver of features of a destination in the vicinity of the destination through linguistic description of the features of the destination and allows another occupant to easily and immediately identify the destination.

The technical objectives of the present invention are not limited to the above, and other objectives may become apparent to those of ordinary skill in the art based on the following description.

According to one aspect of the present invention, there is provided an apparatus for guiding driving with linguistic description of a destination, which is installed on a vehicle and guides driving by outputting a linguistic description on a destination building, wherein the apparatus sets a destination according to a command or input, receives appearance information of a building of the destination from a server, and represents and outputs the appearance information in a linguistic form.

The appearance information may be an image, and the output may include a feature extracted from the image and represented and output in the linguistic form.

The image corresponding to the appearance information may include an image of a part viewed in an approach direction of the vehicle arriving at the destination.

The apparatus may further include searching for a driving route to the destination, and the approach direction may be determined on the basis of the driving route.

The feature may include at least one or a combination of a color, a shape, a height, a signboard, and a material of the building.

The appearance information may include a road view image provided from the server.

The road view image may include an image of a part viewed in an approach direction of the vehicle arriving at the destination.

The apparatus includes matching the appearance information with a front view image captured by a vision sensor device of the vehicle to specify the destination, and calculating a relative distance to the destination to correct a position of the vehicle.

According to one aspect of the present invention, there is provided a system for guiding driving with linguistic description of a destination, the system including: an apparatus for guiding driving with linguistic description of a destination, which is installed on a vehicle and sets a destination according to a command or an input of a driver, requests and receives appearance information of a building of the destination to and from a server, and represents and outputs the appearance information in a linguistic form; and the server configured to transmit the appearance information to the apparatus for guiding driving in response to the request.

According to one aspect of the present invention, there is provided a method for guiding driving with linguistic description of a destination, the method including, by an apparatus for guiding driving with linguistic description of a destination installed on a vehicle, setting a destination according to a command or an input of a driver, requesting and receiving appearance information of a building of the destination to and from a server, and representing and outputting the appearance information in a linguistic form.

DETAILED DESCRIPTION OF EXEMPLARY EMBODIMENTS

Hereinafter, the advantages and features of the present invention and manners of achieving them will become readily apparent with reference to descriptions of the following detailed embodiments when considered in conjunction with the accompanying drawings. However, the present invention is not limited to such embodiments and may be embodied in various forms. The embodiments to be described below are provided only to assist those skilled in the art in fully understanding the objectives, constitutions, and the effects of the invention, and the scope of the present invention is defined only by the appended claims. Meanwhile, terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Figure 1:
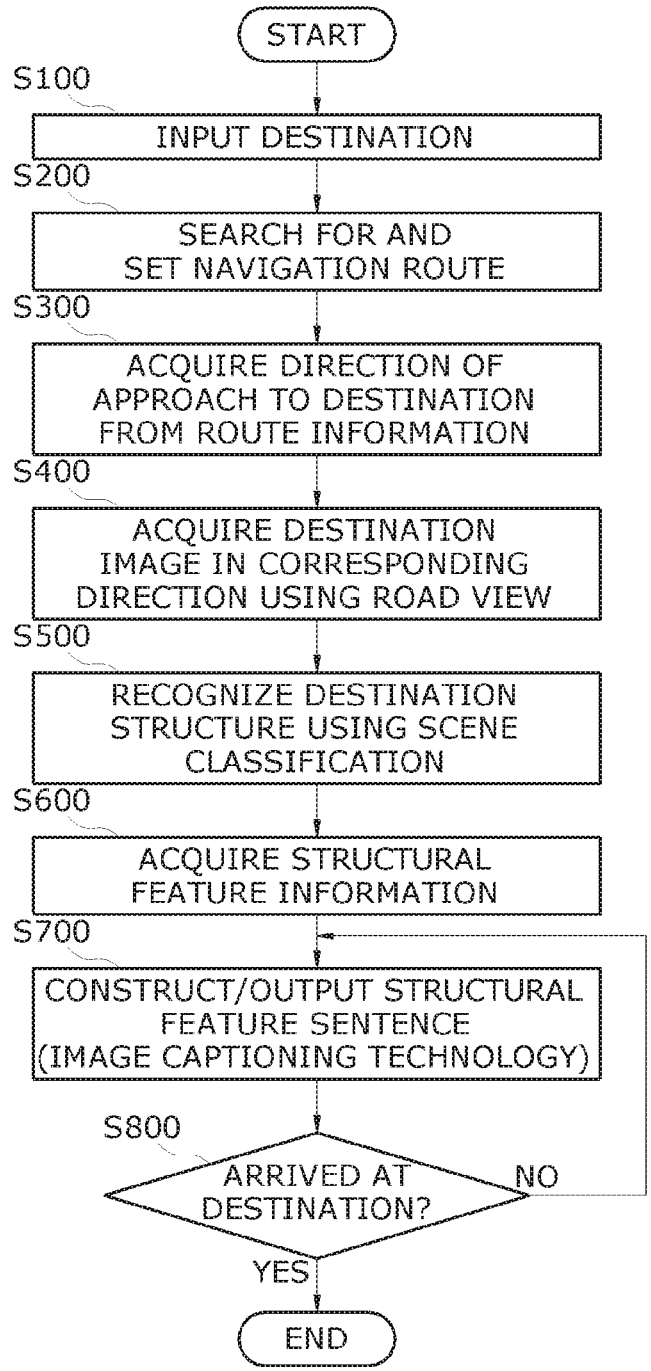
FIG. 1 is a flowchart showing an embodiment of the present invention.

First, a procedure for a driving guide according to an embodiment of the present invention will be described with reference to FIG. 1.

When a destination is input (S100), a navigation route is searched for, a route to be used for actual driving is selected among the found navigation routes, and the selected route is set (S200).

Here, the setting of the route may be automatically performed based on preset criteria of a minimum time, a shortest distance, a large road priority, and the like. Alternatively, the selecting and setting of the route may be performed by selection of a driver or a passenger (who may be a passenger of an autonomous driving vehicle, and in this case, the route may be displayed on a screen inside the autonomous driving vehicle to be checked by the passenger).

Figure 2:
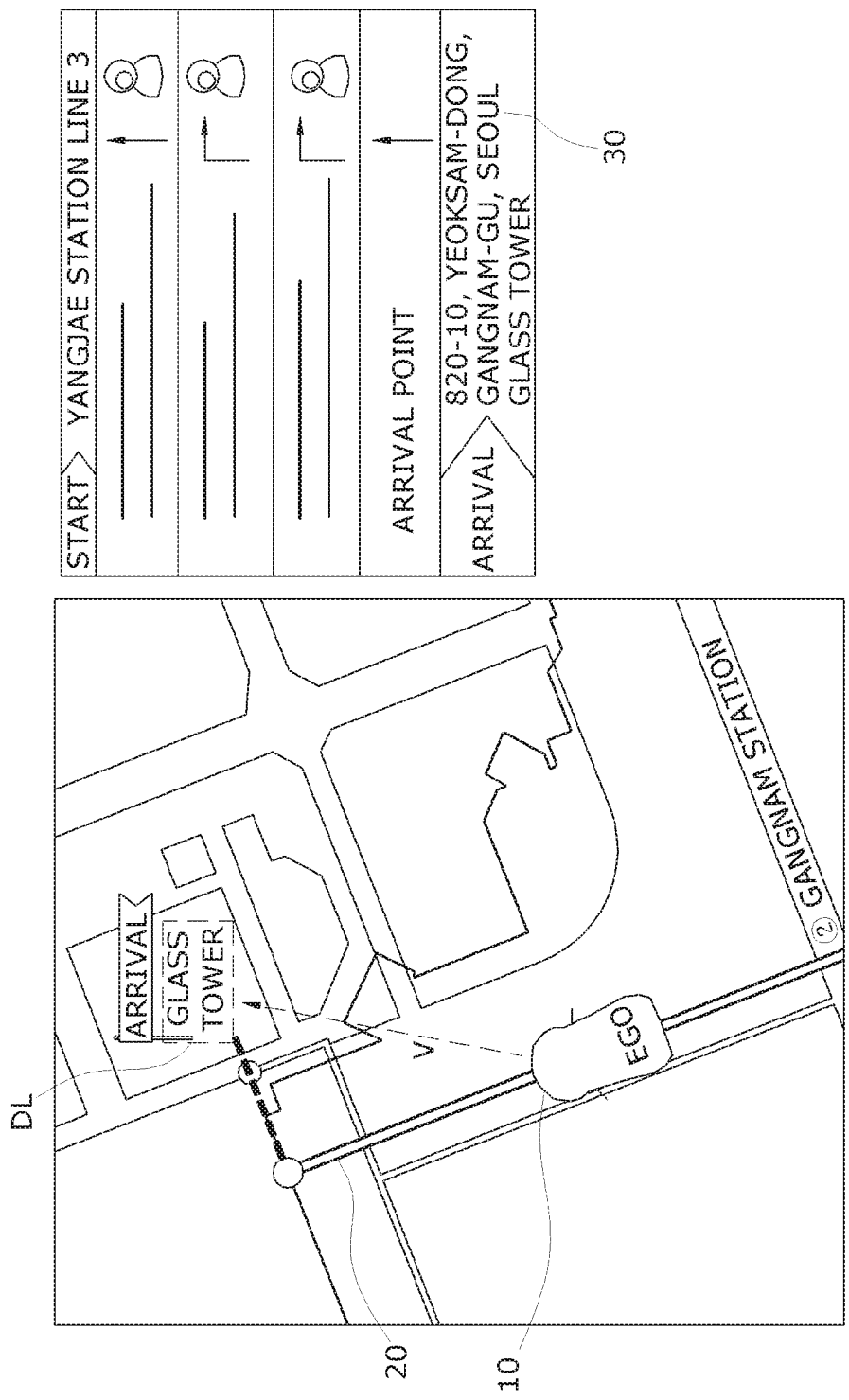
FIG. 2 illustrates an appearance of an ego-vehicle approaching a destination in a navigation setting route.

Referring to FIG. 2, as an example, "Glass Tower" DL near "Gangnam Station" may be set as a destination, and a route search may be performed so that guidance information 30 set as a final route 20 may be represented in the upper right drawing of FIG. 2.

When the route 20 is finally determined and set, a direction of approach to the corresponding destination is determined and obtained from the route information (S300). As shown in the example of FIG. 2, a direction in which an ego-vehicle 10 approaches the destination "Glass Tower" DL may be obtained from the route information. When actual driving progresses and the ego-vehicle 10 arrives in the vicinity of the destination, the appearance of the building viewed in the approach direction is the same as that of the building viewed in a view direction V of FIG. 2.

When the direction of approach to a destination is obtained (S400), access is made to a map server through wireless communication, and road view information of an appearance seen from the direction of approach to the corresponding destination is requested. The map server contains appearances seen from various directions with respect to the destination and transmits road view image information viewed in the requested direction to the ego-vehicle 10.

Figure 3:
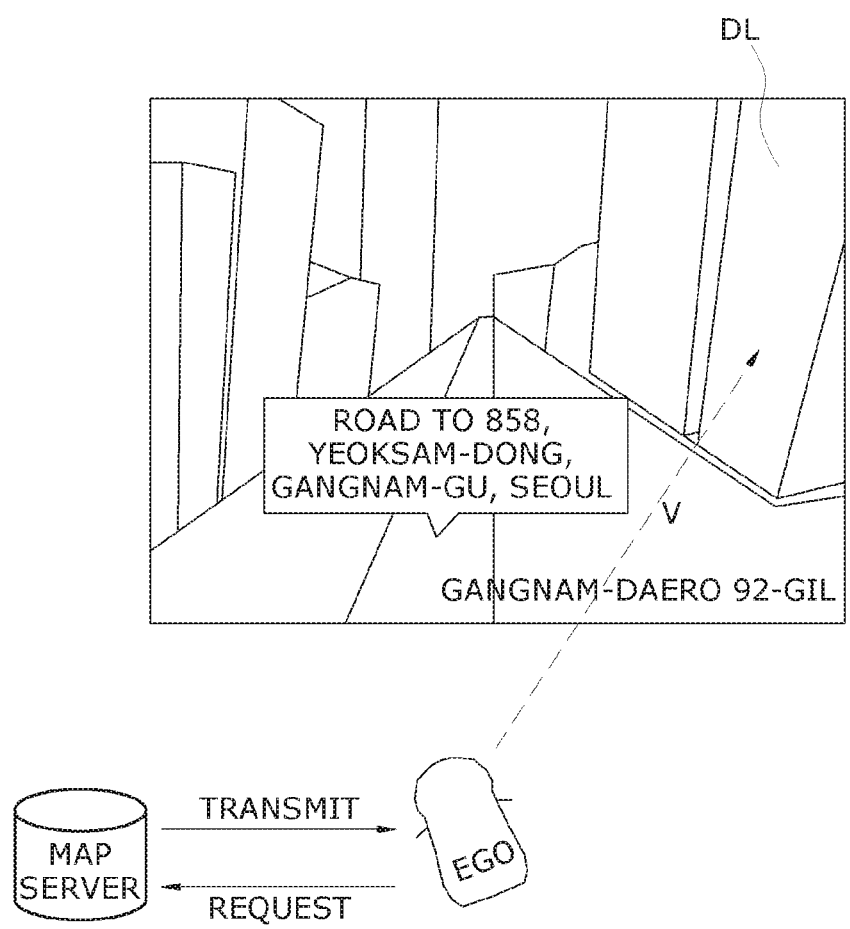
FIG. 3 illustrates an example of a road view for a destination building in the direction of approaching the destination as shown in FIG. 2.

FIG. 3 illustrates an example of a road view image provided by a "Daum" map server viewed in a direction in which the ego-vehicle 10 of FIG. 2 approaches "Glass Tower" DL.

Meanwhile, FIG. 4A to FIG. 4D illustrates another example of a road view image.

Figure 4A:
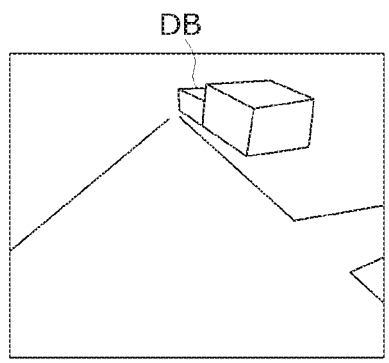
FIG. 4A to FIG. 4D illustrates another example of a road view in which structural features of a destination building vary according to the approaching direction of the ego-vehicle.
Figure 4B:
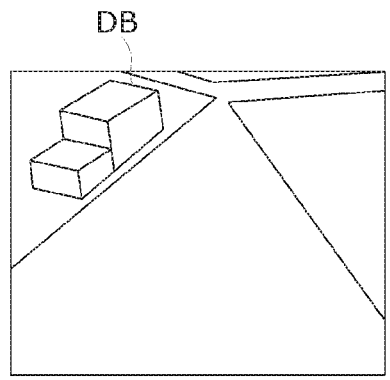
Figure 4C:
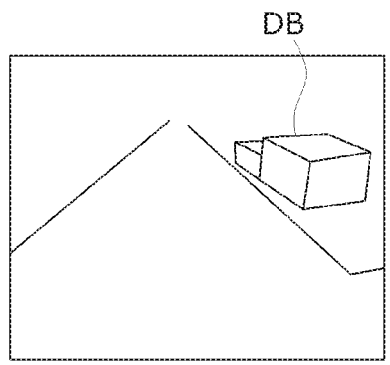
Figure 4D:
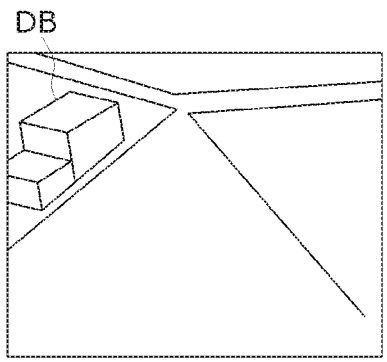

FIG. 4A shows a road view image when approaching a destination building DB from the west, FIG. 4B shows a road view image when approaching the destination building DB from the north, FIG. 4C shows a road view image when approaching the destination building DB from the south, and FIG. 4D shows a road view image when approaching the destination building DB from the east.

The image information about the destination may include information about the corresponding destination. That is, at least a portion corresponding to the destination may be specified in the image and may be included as information together with the image information.

When the image information about the destination is obtained, the structure with respect to the destination is recognized (S500).

In this case, a process of matching a structure with a category corresponding to the structure may be performed according to the destination structure. For example, categories may be classified, for example, into a building, a landmark, such as "oo main gate" or "oo statue," a flat area, such as "oo parking lot" or "oo entrance" according to the destination structure.

For each category, a set of pieces of information to be used as structural features is determined. For example, in the case of a building, a height, a color, a signboard, a material, and the like may serve as elements of the structural features, and in the case of a landmark, a size, a height, an appearance, a color, and the like may serve as elements of the structural features. In the case of a flat region, the material of a floor, marks on a road, and the like may serve as elements of the structural features.

Structural feature information is obtained according to the structural feature elements from the image information of the destination (S600).

Referring again to FIG. 4A to FIG. 4D, in the case of FIG. 4A, the extracted structural features include "glass wall, white wall, four-stories high, and at one o'clock" and in the case of FIG. 4B, the structural features include "signboard, glass structure, five-stories high, and at 11 o'clock,", and in the case of FIG. 4C, the structural features include "white wall, three-stories high, and at 2 o'clock," and in the case of FIG. 4D, the structural features include "two and four stories high, white wall, and at 10 o'clock,"

Then, the structural features are constructed into words, phrases, or sentences for linguistic expression.

For example, in the case of FIG. 4A, the structural features "glass wall, white wall, four-stories high, and at 1 o'clock" may be constructed linguistically into "glass wall, white wall, four-stories high, at 1 o'clock" as it is, or may be made into a sentence "t is a four-story high white glass wall building located at 1 o'clock."

In addition, the contents linguistically constructed as described above may be audibly output through a speaker or may be visibly output through text on a screen (S700).

In this case, it is determined whether arrival at the destination is achieved (S800), and upon determining that arrival at the destination is achieved (YES in operation S800), the driving guide is terminated and upon determining that arrival at the destination is not achieved, the obtained structural feature information is output.

Figure 5:
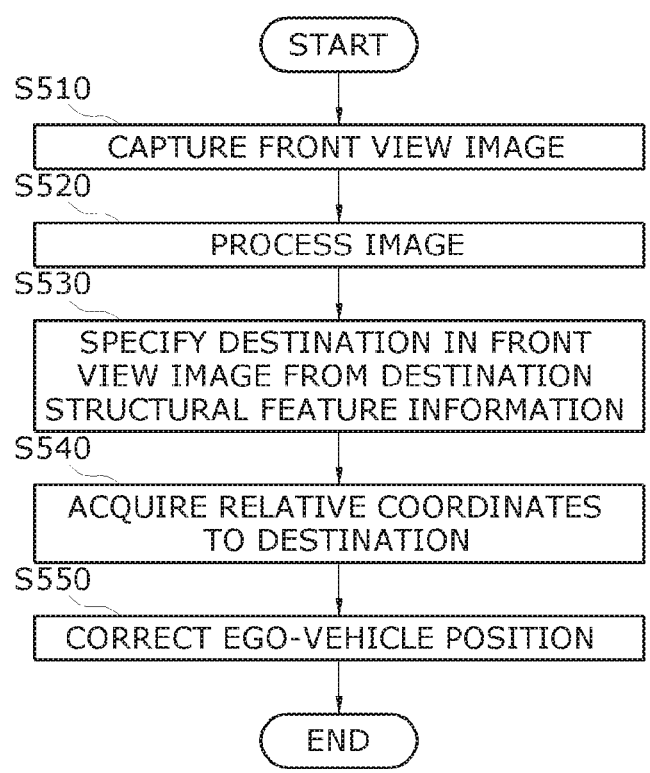
FIG. 5 is a flowchart showing an embodiment of the present invention in which a destination is specified and the position of an ego-vehicle is corrected using a vision sensor in the vicinity of a destination.

Meanwhile, referring to FIG. 5, the ego-vehicle 10 may include an image sensor (not shown) capable of capturing a front view image and captures a front view image near arrival at a destination through the image sensor (S510).

Further, with regard to the received road image, the front view image is captured near arrival at a relative position of the destination. In this case, an image with a view that is significantly similar to that of the road image may be acquired. However, the present invention is not limited thereto and an image may be acquired that is captured at a different position. However, it is desirable to capture the image in an approach direction that approximately matches the road image.

The captured image may be subject to image processing (S520), and a building corresponding to the destination may be specified in the captured image from the structural feature information of the destination (S530).

Then, relative position information of the destination building DB specified as such and the ego-vehicle 10 is acquired (S540), and position information of the ego-vehicle 10 is corrected according to the relative position information (S550). Until the imaging capturing, the position information of the ego-vehicle 10 is identified on the basis of global positioning system (GPS) information. In this case, it is difficult to secure accurate position information due to GPS errors. The GPS errors may be remarkably eliminated or reduced by the correction of the position information of the ego-vehicle 10 using the front view image.

When the position information of the ego-vehicle 10 is secured with high accuracy, the driving route guide to the destination may continue. The conventional navigation devices are incapable of guiding driving when the ego-vehicle 10 enters a GPS error range of a destination, but the apparatus according to the present invention may perform the driving guide to the destination.

On the other hand, as an example of a notification of the destination, a head-up-display (HUD) system using augmented reality may be used. For example, a front view image may be captured by a front image sensor to specify a destination as described above, and then a marking for specifying a destination building DB, which is viewed through a front windshield of the vehicle (for example, in order to represent a boundary on an outer periphery of the building viewed in the front, represent a line of the boundary through the HUD system; or display the name of the destination building DB on the front windshield) may be implemented by the HUD system.

As is apparent from the above, the driver can easily identify the destination in the vicinity of the destination without neglecting to keep his or her eyes forward.

In addition, another occupant also can easily identify the destination so that convenient trip can be realized.

Although the present invention has been described with reference to the embodiments, the embodiments disclosed above should be construed as being illustrative rather than limiting the present invention.

What is claimed is:

1. An apparatus for guiding driving with a linguistic description of a destination, which is installed on a vehicle and includes at least one processor, wherein the apparatus is configured to, using the at least one processor:
   set a destination according to a command or an input of a driver;
   request and receive appearance information of the destination to and from a server; and
   represent and output the appearance information in a linguistic form,
   wherein the apparatus is further configured to, using the at least one processor, match the appearance information with a front view image captured by a vision sensor device of the vehicle to specify the destination in the front view image, acquire a relative position information of the destination and the vehicle based on a matching result, and correct a position of the vehicle in a driving route based on the relative position information.

2. The apparatus of claim 1, wherein the appearance information is an image, and outputting the appearance information includes outputting a feature extracted from the image in the linguistic form.

3. The apparatus of claim 2, wherein the image corresponding to the appearance information includes an image of a part viewed in an approach direction of the vehicle arriving at the destination.

4. The apparatus of claim 3, wherein the driving route to the destination is additionally searched for, and the approach direction is determined on the basis of the driving route.

5. The apparatus of claim 2, wherein the feature includes one or more of a color, a shape, a height, a signboard, and a material of a building of the destination.

6. The apparatus of claim 1, wherein the appearance information includes a road view image provided from the server.

7. The apparatus of claim 6, wherein the road view image includes an image of a part viewed in an approach direction of the vehicle arriving at the destination.

8. The apparatus of claim 1, wherein the appearance information is audibly output through a speaker or visibly output through text on a screen.

9. A system for guiding driving with a linguistic description of a destination, the system comprising:
   an apparatus for guiding driving with a linguistic description of a destination, which is installed on a vehicle, the apparatus setting the destination according to a command or an input of a driver, requests and receives appearance information of the destination to and from a server, and represents and outputs the appearance information in a linguistic form; and
   the server configured to transmit the appearance information to the apparatus in response to a request of the apparatus,
   wherein the appearance information includes a road view image viewed in an approach direction of the vehicle arriving at the destination,
   wherein the vehicle includes a vision sensor device for capturing a front view image, and
   wherein the apparatus matches the road view image with the front view image captured by the vision sensor device to specify the destination in the front view image, acquires relative position information of the destination and the vehicle based on a matching result, and corrects a position of the vehicle in a driving route based on the position information.

10. The system of claim 9, wherein the apparatus extracts a feature from the appearance information and outputs the extracted feature in the linguistic form.

11. A method for guiding driving with a linguistic description of a destination, the method comprising, by an apparatus for guiding driving with a linguistic description of a destination, the apparatus being installed on a vehicle:
   setting a destination according to a command or an input of a driver;
   requesting and receiving appearance information of the destination to and from a server; and
   representing and outputting the appearance information in a linguistic form,
   wherein the method further comprises matching the appearance information with a front view image captured by a vision sensor device of the vehicle to specify the destination in the front view image, acquiring relative position information of the destination and the vehicle based on a matching result, and correcting a position of the vehicle in a driving route based on the position information.

12. The method of claim 11, wherein the appearance information is an image, and outputting the appearance information includes outputting a feature extracted from the image in the linguistic form.

13. The method of claim 12, wherein the image corresponding to the appearance information includes an image of a part viewed in an approach direction of the vehicle arriving at the destination.

14. The method of claim 13, further comprising searching for the driving route to the destination, wherein the approach direction is determined on the basis of the driving route.

15. The method of claim 12, wherein the feature includes one or more of a color, a shape, a height, a signboard, and a material of a building of the destination.

16. The method of claim 11, wherein the appearance information includes a road view image provided from the server.

17. The method of claim 16, wherein the road view image includes an image of a part viewed in an approach direction of the vehicle arriving at the destination.

18. The method of claim 11, wherein the appearance information is audibly output through a speaker or visibly output through text on a screen.

\* \* \* \* \*